(12) United States Patent
Kimura et al.

(10) Patent No.: US 6,236,756 B1
(45) Date of Patent: May 22, 2001

(54) IMAGE ANALYSIS METHOD AND DEVICE

(75) Inventors: Shunichi Kimura; Setsu Kunitake; Yutaka Koshi; Koh Kamizawa, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/210,769

(22) Filed: Dec. 14, 1998

(30) Foreign Application Priority Data

Dec. 22, 1997 (JP) .................................................. 9-352580

(51) Int. Cl.[7] .................................................. G06K 9/46
(52) U.S. Cl. .................................................. 382/239
(58) Field of Search .............................. 382/239; 341/51; 348/404, 407, 419; 358/261.2, 430; 704/270.1

(56) References Cited

U.S. PATENT DOCUMENTS

| 5,121,216 | 6/1992 | Chen et al. ........................ 358/261.3 |
| 5,394,346 | * 2/1995 | Milsom ................................ 364/578 |

FOREIGN PATENT DOCUMENTS 6-165149   6/1994 (JP) ................................ H04N/7/133

OTHER PUBLICATIONS

*International Standard of Multimedia Coding*, Maruzen Publishing Company, pp. 18–43 (1991).

* cited by examiner

*Primary Examiner*—Jose L. Couso
*Assistant Examiner*—Anh Hong Do
(74) *Attorney, Agent, or Firm*—Oliff & Berridge, PLC.

(57) ABSTRACT

An image analysis device and method that have a mechanism for exactly predicting image quality determining factors and determine a coding parameter for an input image by combining plural different image quality determining factors, which does not deteriorate the image quality of the input image and raises the compression ratio as high as possible. In the image analysis device, an image extraction unit 102 extracts an image area to be analyzed from an input image 101. The extracted image area 102 is input to plural physical quantity calculating units 104. Each physical quantity calculating unit 104 calculates a physical quantity 105 independently of others and each of obtained physical quantities 105 is input to plural image quality determining factor calculating units 106. On receiving the plural physical quantities 105, each of the image quality determining factor calculating units 106 calculates an image quality determining factor 107. A coding parameter calculating unit 108 calculates a coding parameter based on the plural image quality determining factors 107 output from the plural image quality determining factor calculating units 106.

24 Claims, 21 Drawing Sheets

CORRELATION COEFFICIENT 0.290

CORRELATION COEFFICIENT 0.532

CORRELATION COEFFICIENT 0.444

CORRELATION COEFFICIENT 0.473

$$\begin{bmatrix} 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \\ 255 & 0 & 255 & 0 & 255 & 0 & 255 & 0 \\ 0 & 255 & 0 & 255 & 0 & 255 & 0 & 255 \end{bmatrix}$$

FIG. 17

$$\begin{bmatrix} 255 & 255 & 255 & 255 & 0 & 0 & 255 & 255 \\ 255 & 255 & 255 & 255 & 255 & 0 & 255 & 255 \\ 255 & 255 & 255 & 255 & 0 & 255 & 255 & 255 \\ 255 & 255 & 255 & 0 & 0 & 255 & 255 & 255 \\ 255 & 255 & 255 & 0 & 255 & 255 & 255 & 255 \\ 255 & 255 & 0 & 0 & 255 & 255 & 255 & 255 \\ 255 & 255 & 0 & 255 & 255 & 255 & 255 & 255 \\ 255 & 0 & 255 & 255 & 255 & 255 & 255 & 255 \end{bmatrix}$$

INPUT IMAGE

FIG. 18(a)

$$\begin{bmatrix} 255 & 251 & 255 & 241 & 0 & 25 & 229 & 255 \\ 255 & 232 & 255 & 255 & 255 & 0 & 255 & 237 \\ 229 & 255 & 253 & 244 & 0 & 255 & 228 & 255 \\ 255 & 227 & 255 & 13 & 0 & 254 & 255 & 255 \\ 255 & 231 & 212 & 41 & 255 & 255 & 247 & 246 \\ 254 & 255 & 10 & 0 & 242 & 246 & 234 & 255 \\ 228 & 255 & 0 & 252 & 255 & 255 & 254 & 255 \\ 255 & 0 & 255 & 255 & 211 & 255 & 234 & 250 \end{bmatrix}$$

IMAGE DECODED BY JPEG - DCT METHOD

FIG. 18(b)

$$\begin{bmatrix} 665.3 & -37.5 & 301.6 & 8.8 & -31.9 & 44.2 & 21.4 & 25.0 \\ -28.0 & 193.7 & 103.6 & -293.2 & -78.1 & 99.7 & -54.1 & -8.2 \\ 17.3 & 20.3 & -144.6 & -135.6 & 218.3 & 172.0 & -86.3 & -13.6 \\ -56.6 & 4.0 & 80.8 & 83.1 & 31.8 & -148.0 & -149.0 & 47.3 \\ -31.9 & 12.6 & 31.5 & -80.0 & -95.6 & 61.8 & 159.4 & 100.0 \\ -53.7 & 8.7 & 104.0 & 5.9 & -71.3 & 44.4 & -20.1 & -195.0 \\ -41.6 & -29.9 & 41.2 & 11.5 & -55.9 & 57.8 & 80.8 & -63.0 \\ 72.9 & 18.3 & -57.0 & -28.2 & -2.1 & 33.2 & 6.8 & -66.2 \end{bmatrix}$$

DCT COEFFICIENT

FIG. 18(c)

ns. The images
IMAGE ANALYSIS METHOD AND DEVICE

BACKGROUND OF THE INVENTION

1. Field of the Invention

The present invention relates to a device and method for analyzing an input image and calculating an image coding parameter for compressing the image.

2. Discussion of the Related Art

Recently, a capacity of a storage medium or transmission time has been reduced by compressing images. The images electronically stored or transmitted come to be of high resolution and full-colored, and thus of a large capacity. Therefore, it is important to raise a ratio of image compression. Hereinafter, image coding and image compression indicate the same meaning.

There are two types of image compression methods: the lossless image compression and the lossy image compression. When the lossless image compression method is used, a compressed image is completely restored to what it was by decompressing. When the lossy image compression method is used, a compression ratio is expected to be higher than that of the lossless image compression method. However, a compressed image cannot be completely restored by decompressing and the image quality is deteriorated.

In general, under the same coding conditions, the compression ratio and the image quality are inversely proportional to each other. In other words, when the compression ratio is low, a small amount of information is lost and the image quality is maintained. However, if the compression ratio is raised, a large amount of information is lost and the image quality is deteriorated.

An image compression apparatus or method can control the image compression ratio and the image quality by changing an image coding parameter.

In compressing an image, it is desired to maintain a predetermined image quality while compressing the image with the compression ratio as high as possible. That is, it is required to control the coding parameter to provide the best tradeoff between the compression ratio and the image quality so that the compressed image is visually lossless in comparison with the image before compression.

In many cases, an input image has local image characteristics different from one another. In some portions, deterioration in image quality is easily observed and in the other portions, deterioration in image quality is hardly observed. Considering the image quality of the input image as a whole, it is necessary to lower the overall compression ratio to reduce deterioration in image quality in the portions where the deterioration is easily observed.

The following method makes it possible to raise the overall compression ratio while maintaining the image quality.

An input image is divided into blocks. It is then determined whether the deterioration in the image quality is easily observed in each of the divided blocks. A coding parameter that lowers the compression ratio is provided to the blocks where the deterioration in the image quality is easily observed. On the other hand, a coding parameter that raises the compression ratio is provided to the blocks where the deterioration of the image quality is not easily observed. Thereby, the compression ratio in the portions of the image where the deterioration in the image quality is rarely observed can be raised. Thus, the overall compression ratio can be raised while the image quality is uniformly maintained.

In this method, the different coding parameter is selected for each of the blocks. Therefore, the selected coding parameter is added to the head of the code of each block as shown in FIG. 14 and is also coded.

FIG. 19 shows a configuration example of an image coding apparatus used in general to which the present invention is to be applied. In the figure, an input image 1901 is divided by an input image dividing circuit 1902. A divided image 1907 is transmitted to an image quality analysis circuit 1903 and a lossy coding circuit 1905. The image quality analysis circuit 1903 analyzes the divided image 1907 and outputs a coding parameter 1904. The lossy coding circuit 1905 performs coding of the divided image 1907 using the coding parameter 1904 and outputs code 1906.

The present invention relates to the image quality analysis circuit 1903 in FIG. 19.

Conventional examples are described more specifically. As a concrete method able to control the image quality or compression ratio by changing the coding parameter, JPEG is described, for example, in "International Standard of Multimedia Coding", Maruzen Publishing Company, pp. 18–43. In a method using Discrete Cosine Transform (DCT) represented by JPEG, a higher compression ratio is available with the same image quality by using a quantization matrix adaptive to the characteristics of input image blocks.

The DCT is briefly explained by reference to FIG. 15.

In the figure, input image information 1501 is divided into rectangular blocks by a blocking circuit 1502. An orthogonal transform circuit 1503 performs an orthogonal transform on each of the divided blocks of the image information and outputs an orthogonal transform coefficient 1504. The orthogonal transform coefficient 1504 is quantized with a predetermined quantization matrix by a quantization circuit 1505. A coding circuit 1506 provides a code to the quantized orthogonal transform coefficient and outputs it as a code 1507.

In the coding method as shown in FIG. 15, the same quantization process is performed on all blocks. Therefore, deterioration in image quality is caused in the blocks where distortion is prone to occur. On the other hand, in the blocks where distortion rarely occurs, visually useless and unnecessary information is also coded.

As aforementioned, there is a method able to raise the compression ratio while maintaining the image quality by performing different quantization processes on image portions where deterioration in image quality is easily observed and on those where deterioration is rarely observed. The method is explained by reference to FIG. 16. Constituents corresponding to constituents in FIG. 16 have the same reference numbers as those in FIG. 15.

In FIG. 16, each of the divided blocks of the image information is transmitted to an image analysis circuit 1508 and characteristics of the image in the block are analyzed. A result of the analysis 1509 is transmitted to a quantization process selection circuit 1510 and a quantization process is selected. In the DCT coding method, specifically, the quantization process selection circuit 1510 selects a quantization matrix optimum to the result of the analysis 1509. The selected quantization process 1511 is transmitted to the quantization circuit 1505 to be performed. Other circuits operate as same as those corresponding thereto shown in FIG. 15.

In the above-described methods, the image analysis method for analyzing an image and calculating a coding parameter is important for improving both image quality and compression ratio. There are many types of analysis methods. Two examples of conventional image analysis device are described as follows by reference to FIG. 16. FIG. 16 shows main parts extracted from the two conventional examples and rearranged.

A conventional example 1 is disclosed by Japanese Patent Application Laid-Open No. 6-165149. It is determined whether input image blocks are suitable to be coded by the coding method employed here. If they are determined to be suitable, high image quality is expected in the result of coding, and accordingly, they are coded with a high compression ratio. Otherwise, if they are not suitable, low image quality is expected. Therefore, the blocks are coded with a low compression ratio to improve the image quality.

In the conventional example 1, the image analysis circuit 1508 shown in FIG. 16 calculates a physical quantity 1509 indicating probability of occurrence of mosquito noise in each block. The quantization process selection circuit 1510 selects a quantization matrix corresponding to the physical quantity 1509 to raise the compression ratio while maintaining the same image quality. Then a code amount in the blocks showing high probability of occurrence of the mosquito noise is controlled to be increased, and a code amount in the blocks showing low probability of occurrence of the mosquito noise is controlled to be decreased. Thus, a higher compression ratio is available with the uniform image quality.

More specifically, the image analysis circuit 1508 of the conventional example 1 applies a 3×3 filter window to each of the pixels in a block. An average of absolute values of differences in the gradation level between the center pixel and surrounding pixels is calculated. Then the number of pixels such that a ratio of the average to a range of a gradation level signal in the block is not more than a predetermined threshold value is calculated. If the number of such pixels in a block is not less than a predetermined value, it is determined that the mosquito noise rarely occurs. If the number of pixels is less than the threshold value, it is determined that the mosquito noise is prone to occur.

Two parameters are used here: the threshold value for the ratio of the average of the absolute values of differences in the gradation level between the pixels to the range of the gradation level signal in a block; and the threshold value for the number of pixels such that their ratio of the average of the absolute values of the differences to a range of a gradation level signal in the block is not more than a predetermined value.

A conventional example 2 is disclosed by U.S. Pat. No. 5,121,216. In this example, when distortion is generated in an input image block by coding, it is determined whether the distortion is visually observed with ease. If it is determined to be easily observed, coding is performed with a low compression ratio. If it is determined otherwise, a high compression ratio is used. Thereby, a higher compression ratio is available with the image quality for which the human visual system is not sensitive to deterioration.

In the conventional example 2, a higher compression ratio is adopted for a complex image because distortion is rarely observed in the complex image. Specifically, the DCT is performed in the input blocks. Then a quantization characteristic is determined corresponding to an absolute value of the (K+1)th largest DCT coefficient. If the (K+1)th DCT coefficient becomes larger, a quantization step is also made larger. Since a block having the large (K+1)th DCT coefficient is a complex block, it is expected that the distortion is rarely observed even if the quantization step is increased. A block having the small (K+1)th DCT coefficient is not a complex block, and therefore the quantization step is reduced so that the distortion is not easily observed.

The parameter used in the conventional example 2 is K.

In the conventional example 1, the quantization step is reduced for an image expected to be prone to show the mosquito noise, and it is increased for an image expected to rarely show the mosquito noise. In the conventional example 2, the quantization step is increased for an image having a large DCT coefficient, and it is reduced for an image having a small DCT coefficient.

In the conventional example 1, if it is correctly analyzed that the input image is really prone to generate the mosquito noise, the above method of controlling the quantization step is suitable. However, in the conventional example 1, it is not assured that the employed analysis method properly corresponds to tendency of occurrence of the mosquito noise. If the analysis method does not properly analyze the tendency of occurrence of the mosquito noise, it is difficult to modify the method to properly correspond thereto because the number of parameters used in the method is only two.

In the conventional example 2, if it is correctly analyzed that the input image is really complex and the distortion is masked, the above method of controlling the quantization step is suitable. However, in the conventional example 2, it is not assured that the employed analysis method properly corresponds to probability of masking the distortion. If the analysis method does not correctly analyze the probability of masking the distortion, it is difficult to modify the method to properly correspond thereto because the number of parameters used in the method is only one.

However, even if the analysis method used in the conventional example 1 correctly analyzes the tendency of occurrence of the mosquito noise, the conventional example 1 cannot be applied in the following case: an image is analyzed and determined to generate the mosquito noise, but the noise is masked and cannot be observed because of the complexity of the image. For example, the conventional example 1 determines the input image block shown in FIG. 17 to be expected to generate a large amount of mosquito noise. However, the mosquito noise actually occurs in an image portion of a fair size around an edge. Therefore, the mosquito noise rarely occurs in the image shown in FIG. 17 because of a small sized portion between the edges. In this case, the distortion is not observed even if the compression ratio is raised. However, the compression ratio cannot be actually raised since the method determines otherwise.

The conventional example 2 cannot be applied to the following case. The input image shown in FIG. 18($a$) consists of pixels each having a value of 0 or 255. However, parts of the pixel values are changed in the decoded image as shown in FIG. 18($b$). That is, the mosquito noise occurs in the decoded image. If this input image block is DCT transformed, extremely large DCT coefficients are generated for the whole DCT coefficient area as shown in FIG. 18($c$). According to the analysis of the DCT coefficient area, it is determined that the image is complex and it may be considered that the quantization step should be increased. However, the quantization step actually cannot be increased because of the mosquito noise. If the quantization step is increased, the mosquito noise occurs and the image quality is deteriorated.

The problems described above are summarized as follows.

(1) In each of the conventional examples, factors affecting the image quality are predicted only based on a predetermined physical quantity (for example, the output of the 3×3 filter window in the conventional example 1 and the (K+1)th largest DCT coefficient in the conventional example 2). With such predetermined physical quantity, the number of parameters used for calculating each physical quantity is limited. Therefore, it is difficult to modify the matrix to finally determine the image quality taking the factors that affect the image quality into consideration.

(2) It is considered that there are plural factors that affect the image quality. However, in the conventional examples, only one factor is taken into account or the plural factors cannot be dealt with. Consequently, deterioration in the image quality occurs or the compression ratio is lowered.

SUMMARY OF THE INVENTION

The present invention has been made in view of the above circumstances and has an aspect to provide an image analysis method and device that raise the compression ratio while maintaining the image quality of the input image with a mechanism for correctly predicting image quality determining factors (factors that affect the image quality such as occurrence of the mosquito noise, masking of distortion or the like) and determining a coding parameter for an input image based on a combination of plural different image quality determining factors.

Additional aspects and advantages of the invention will be set forth in part in the description which follows and in part will be obvious from the description, or may be learned by practice of the invention.

In the present invention, the physical quantity indicates digital quantity obtained by digital operation based on input digital image data.

In the conventional examples, the characteristics of the coding method is roughly examined and based on the result of the examination, a physical quantity that seems to be appropriate is selected to be used for analysis. That is, only a selected physical quantity is available. Therefore, it is difficult to precisely predict the coding parameter.

In the present invention, there is no process of selecting the physical quantity. All possible physical quantities are employed unless there are inconveniences in implementation. The present invention has a mechanism for systematically incorporating employed physical quantities and predicting the coding parameter. Since there is no limitation in principle to the number of physical quantities, whenever a new method of physical quantity calculation is devised, more precise prediction of the coding parameter becomes possible.

The configuration including two-step analysis enables both systematic incorporation of plural physical quantities and interactions among them in prediction of the coding parameter.

Plural image quality determining factors are predicted from plural physical quantities, respectively, and then a coding parameter is predicted by integration of plural different image quality determining factors as follows.

1) For making the prediction of each image quality determining factor more precise, it is performed based on plural functions of the physical quantity. Because of plural parameters of the respective plural functions, available sets of parameters are increased. Therefore, prediction that is more precise is possible.

2) The coding parameter is determined by integrating the plural image quality determining factors. In many cases, when an affection of one of the image quality determining factors is quite large, affections of the other image quality determining factors are masked. However, this method can correctly predict the image quality determining factors in spite of the masking effect.

To achieve the aspects and in accordance with the purpose of the invention, as embodied and broadly described herein, an image analysis device of the present invention which obtains a coding parameter for each image portion to be coded in an input image for coding thereof, comprises an image extraction unit that extracts an image area including an image portion to be coded from the input image. The device also comprises at least one first physical quantity calculating unit that calculates a first physical quantity indicating a characteristic of the image area, and plural second physical quantity calculating units each of which calculates a second physical quantity of the image area based on at least one first physical quantity calculated by at least one first physical quantity calculating unit. The device further comprises a coding parameter calculating unit that calculates a coding parameter for the image portion to be coded based on the plural second physical quantities.

In general, an input image is divided into rectangular blocks and coding is performed on each of the blocks. The image portion to be coded mentioned in the above configuration corresponds to the block to be coded. The image area extracted by the image extraction unit is as large as the block to be coded or larger than the block to be coded.

In the above configuration, the first physical quantity corresponds to the physical quantity mentioned in the background of the invention. The second physical quantity corresponds to the image quality determining factor mentioned in the background of the invention.

With the above configuration, the two-step analysis is performed: plural image quality determining factors are independently predicted based on the plural physical quantities; and a coding parameter is predicted by integrating plural different image quality determining factors.

The coding parameter is, in JPEG-DCT coding method, for example, a multiplier in multiplication of a predetermined quantization matrix.

The present invention may have a first storage unit that stores plural first physical quantities indicating characteristics of plural image portions in the image area except the image portion to be coded. From the plural first physical quantities, the first physical quantity of the image area including the image portion to be coded can be calculated.

In other words, in the present invention, it is possible to refer to the surrounding blocks of the block to be coded for calculating the coding parameter. The plural image portions except the image portion to be coded mentioned above means the surrounding blocks of the block to be coded. In this case, it is unnecessary to calculate the physical quantities of the surrounding blocks every time the coding parameter is obtained because they are already stored.

The second physical quantity calculating unit, namely, a unit that calculates the image quality determining factor, may comprise at least one first physical quantity transform unit that transforms a value of the input first physical quantity based on a parameter, a first physical quantity addition unit and a coefficient retaining unit that retains a coefficient obtained by adding one to the first physical quantity. The second physical quantity can be obtained by transforming each of the first physical quantities, multiplying each of the transformed quantities by the coefficient, and adding the results together.

For example, suppose that there are three first physical quantities having values A, B and C. It is a characteristic of an image quality determining factor to be obtained by a linear combination of functions for A, B and C as follows.

$$X = a \times f(A) + b \times g(B) + c \times h(C) + d$$

Each of the functions f(A), g(B) and h(C) includes at least one parameter.

The functions f(A), g(B) and h(C) are supposed to be A to the power I, B to the power n and C to the power m, respectively. The numbers I, m and n are the real numbers.

The coding parameter calculating unit comprises a second physical quantity transform unit, a second physical quantity addition unit and a coefficient retaining unit that retains a coefficient obtained by adding 1 to the second physical quantity. The coding parameter can be obtained by transforming each of the plural second physical quantities with a linear or nonlinear function, multiplying each of the transformed quantities by the coefficient and adding the results together.

Suppose that there are three second physical quantities, namely, three image quality determining factors, having values A, B and C, respectively. A characteristic of the coding parameter X is to be obtained as a linear combination of functions for A, B and C as follows.

$$X = a \times f(A) + b \times g(B) + c \times h(C) + d$$

It is possible to regard the coding parameter generated by the linear combination as a provisional one and transform the provisional coding parameter X with a nonlinear function to obtain an objective coding parameter.

In this case, the nonlinear function for transforming the provisional coding parameter can be implemented as a lookup table. It is possible to prepare plural lookup tables and select one of them to control the image quality.

If an image quality determining factor is smaller than others, it may be excluded from the calculation of the coding parameter, that is, corresponding amount of the image quality determining factor can be regarded as zero because the affection to the image quality is very small.

Suppose that there are two second physical quantities, namely, two image quality determining factors and their values are A and B (each of A and B is plus or zero), and there are predetermined thresholds P and Q. Then the following process is executed:

when A−B>threshold P, B=0; and
when B−A>threshold Q, A=0.

Further, suppose that there are three second physical quantities, namely, three image quality determining factors and their values are A, B and C (each of A, B and C is plus or zero). Then the following process is executed:

when A−B>threshold AB, B=0;
when B−A>threshold BA, A=0;
when A−C>threshold AC, C=0;
when C−A>threshold CA, A=0;
when C−B>threshold CB, B=0; and
when B−C>threshold BC, C=0.

The amounts of image quality determining factors can be gradually reduced instead of being reduced to zero as aforementioned.

The first physical quantity is, for example, an average or a distribution of pixel values in an input image area.

It is also possible to obtain the first physical quantity in the following way. Hereinafter, the obtained value is referred to as an average crossing number.

1) Set a counter to zero.
2) Obtain an average of pixel values in an input image area.
3) Scan the pixel values in the input image area in order of raster scanning.
4) Compare the size of each pixel value in the input image area with that of the average.
5) Increment the counter if relation in size between the current pixel value and the average is not the same as the relation in size between an immediately before pixel value and the average.
6) Operate the above 1)–5) in the input image area and output the value of the counter.

High-pass filtering can be applied to the input image area and a maximum value of the filtering output can be the first physical quantity.

It is also possible to apply high-pass filtering to the input image area and determine the number of pixels whose filtering output becomes smaller than a predetermined threshold value to be the first physical quantity.

The first physical quantity may be the difference between the maximum value and minimum value of the pixel values in the input image area.

It is also possible to generate the first physical quantity by performing discrete cosine transform on the pixel values in the input image area and extract a part of the discrete cosine transform coefficients and obtain the sum of squares.

In the present invention, the coding parameter is determined for each of the image quality determining factors and one of the coding parameters that provides the best image quality is selected. In other words, the coding parameter calculating unit may include an individual coding parameter calculating unit that transforms each second physical quantity and a coding parameter selection unit that selects a coding parameter which results in the best image quality from the plural coding parameters calculated by the individual coding parameter calculating units.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 17 illustrates an example of pixel values in an input block;

FIGS. 18(a)–18(c) illustrate another example of pixel values in an input block.

DETAILED DESCRIPTION OF THE PREFERRED EMBODIMENTS

First Embodiment

In a first embodiment, plural physical quantities are calculated and three image quality determining factors are calculated from the physical quantities as an example. A provisional coding parameter is then calculated from the three image quality determining factors and an objective coding parameter is calculated by a coding parameter transform unit.

Figure 1:
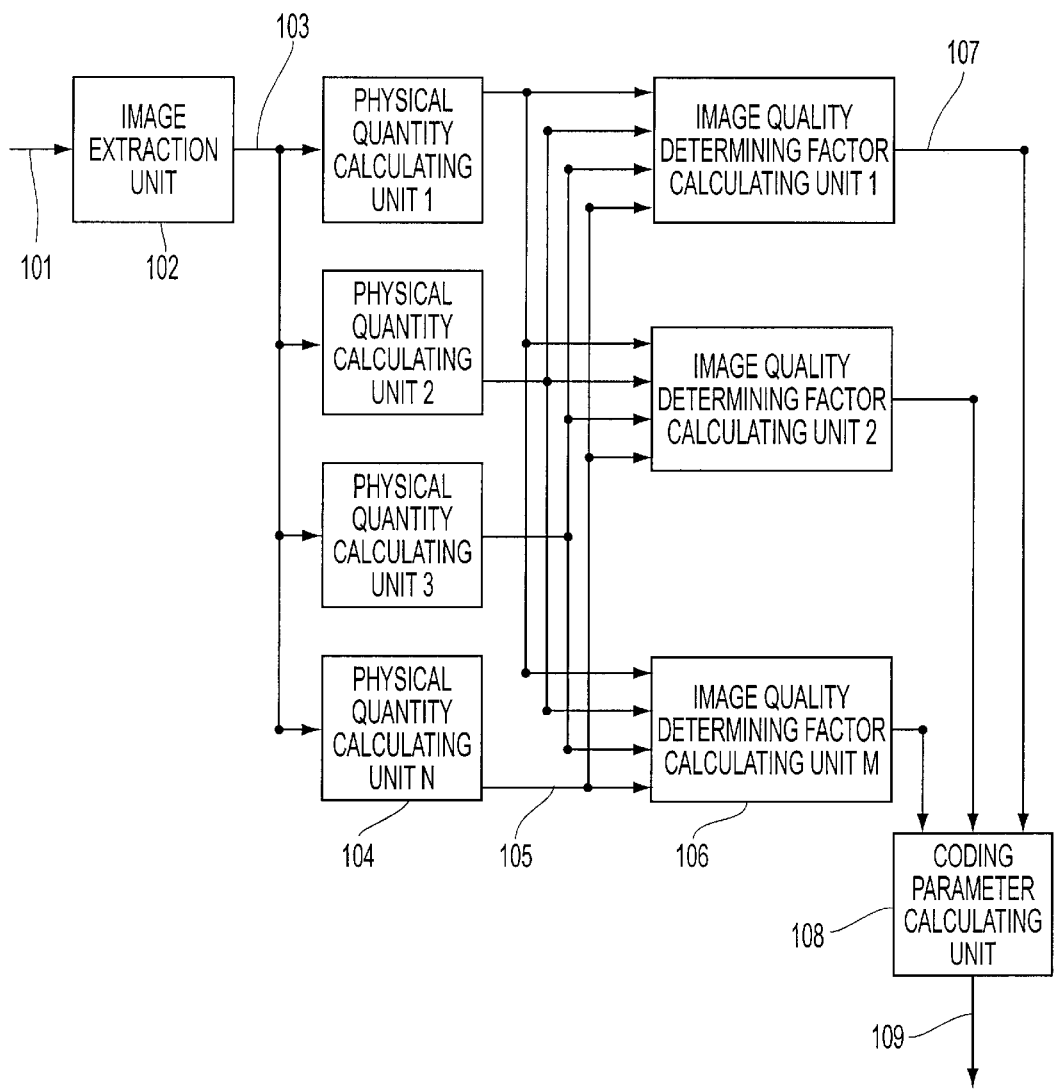
FIG. 1 is an exemplary block diagram showing an overall configuration of a first embodiment of the present invention.

FIG. 1 depicts an overall configuration of the first embodiment. An image extraction unit 102 extracts an image area to be analyzed from an input image 101. The extracted image area 102 is input to plural physical quantity calculating units 104. Each of the physical quantity calculating units independently calculates a physical quantity 105. Each physical quantity 105 is input to plural image quality determining factor calculating units 106. Plural physical quantities 105 are input to each of the image quality determining factor calculating units 106 and image quality determining factors 107 are calculated. A coding parameter calculating unit 108 calculates a coding parameter 109 from the plural image quality determining factors 107.

Figure 2:
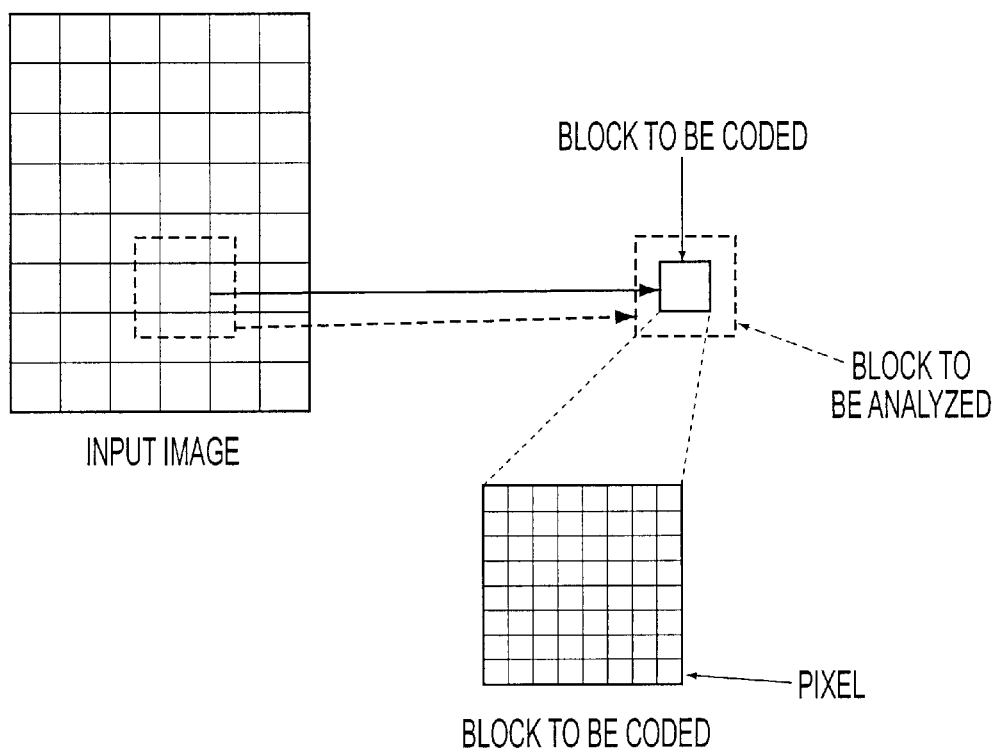
FIG. 2 illustrates an image extraction unit of the first embodiment.

FIG. 2 illustrates the image extraction unit. In the figure, an input image is divided into rectangular blocks. Coding is performed on each of the divided blocks. The coding parameter is changed for each of the blocks. Input blocks are analyzed and an appropriate parameter is provided to each of them. The blocks to be analyzed are not necessary the same as those to be coded. As shown in FIG. 2, the blocks to be analyzed should be extracted including the blocks to be coded. As a matter of course, it is possible that the blocks to be analyzed are the same as those to be coded.

Figure 10:
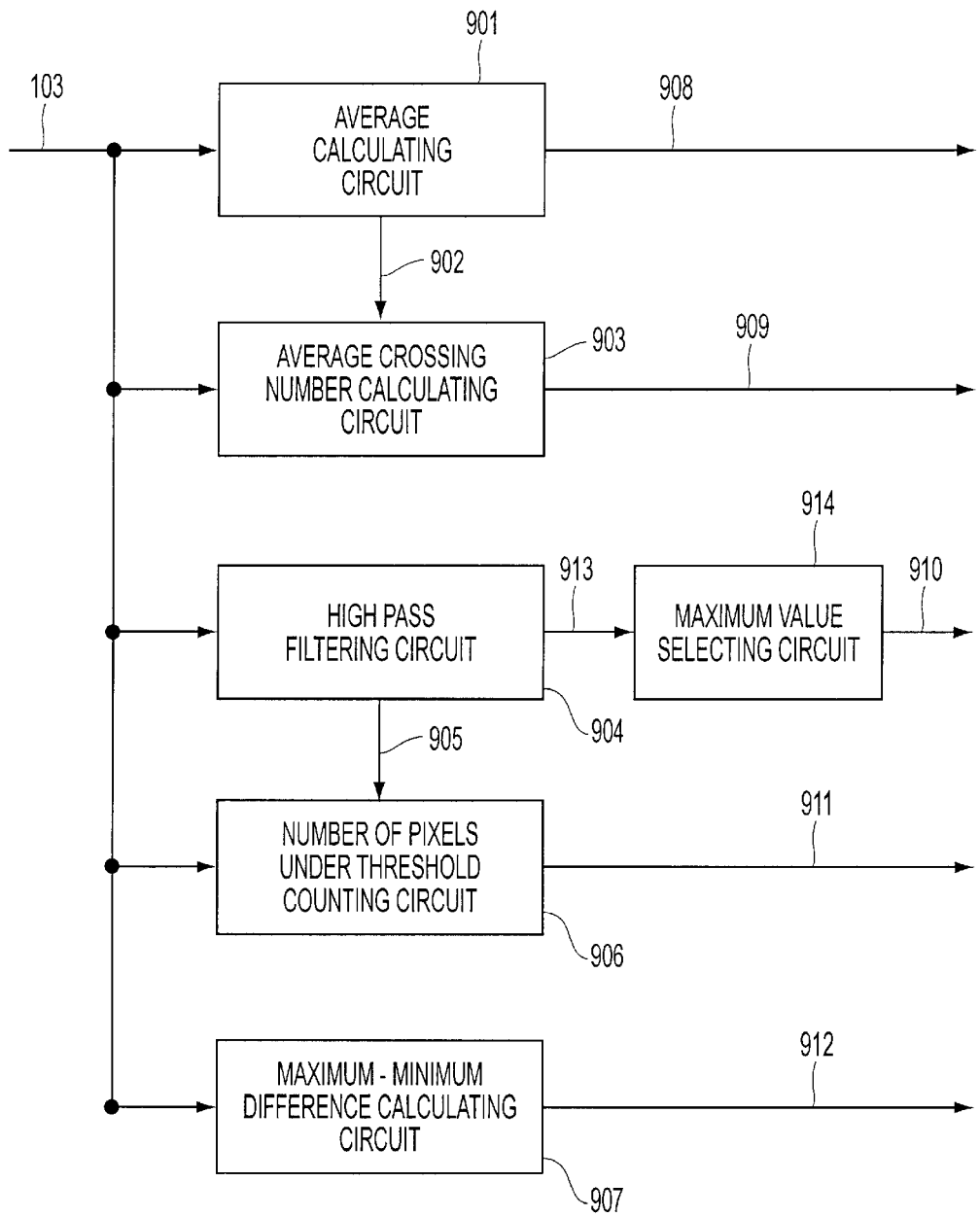
FIG. 10 is an exemplary block diagram showing a configuration of a physical quantity calculating unit of the second embodiment.

FIG. 10 shows an example of the physical quantity calculating unit 104. In the figure, an average calculating circuit 901, an average crossing number calculating circuit 903 including the average calculating circuit 901, a maximum value selecting circuit 914 including a high-pass filtering circuit 904, a number of pixels under threshold counting circuit 906 including the high-pass filtering circuit 904 and a maximum-minimum difference calculating circuit 907 correspond to the physical quantity calculating units 104 shown in FIG. 1, respectively. The average 908, the average crossing number 909, the maximum high-pass pixel value 910, the number of pixels under the threshold 911 and the maximum-minimum difference 912 correspond to the physical quantities 105 shown in FIG. 1, respectively.

From the image area to be analyzed 103, the average calculating circuit 901 calculates the averages 908 and 902 in the image area to be analyzed. Based on the image area to be analyzed 103 and the average 902, the average crossing number calculating circuit 903 calculates the average crossing number 909. Further, based on the image area to be analyzed 103, the high-pass filtering circuit 904 outputs the high-pass images 913 and 905. The maximum value selecting circuit 914 calculates the maximum value of the high-pass image 913 and outputs the maximum high-pass pixel value 910. The number of pixels under threshold counting circuit 906 calculates the number of pixels under threshold 911 from the image area to be analyzed 103 and the high-pass image 905. The maximum-minimum difference calculating circuit 907 calculates the maximum-minimum difference 912.

Here, it is supposed that the pixel value to be analyzed in an image area is X (i, j). Further, it is supposed that the image area has m pixels in the lateral direction and n pixels in the longitudinal direction. The characters i and j indicate lateral and longitudinal coordinates, respectively, provided that $1 \leq i \leq m$ and $1 \leq j \leq n$.

The average calculating circuit 901 realizes the following expression by hardware or software:

$$average = \left[\sum_{j=1}^{m}\sum_{i=1}^{n} X(i, j)\right] / (m \times n).$$

The average crossing number calculating circuit 902 realizes, for example, the following algorithm by hardware or software.

(1) j=1, K=0, M=average (2) U=X(1, j)−M, i=2

(3) V=X(i, j)−M (4) when U×V<0, K is incremented by 1. V is substituted for U.

(5) when i<m, i is incremented by 1 and the step returns to (3). When i=m, the step proceeds to (6).

(6) when j<n, j is incremented by 1 and the step returns to (2). When j=n, the algorithm is completed. The value of K at this time is the average crossing number.

The high-pass filter output value Y(i, j) is realization of the following expression by hardware or software:

[0089]

$$Y(i, j) = \sum_{t=-q}^{q}\sum_{s=-p}^{p} C(s, t) \times X(i+s, j+t),$$

wherein the filter coefficient is C(i, j) and the coefficient ranges from −p to p in the lateral direction and from −q to q in the longitudinal direction.

The following expression is a specific example of the high-pass filtering calculation:

Y(i, j)=4×X(i, j)−X(i−1, j)−X(i+1, j)−X(i, j−1)−X(i, j+1).

An example of exceptional processing for an endpoint of a block is now described. The endpoint is as follows:

i−1<1 or i+1>m or j−1<1 or j+1>n.

In these cases, calculation is performed on the presumption that the pixel value is zero. Suppose that the number of pixels whose value is zero is W. Then the following expression is established:

Y(i, j)=(4−W)×X(i, j)−X(i−1, j)−X(i+1, j)−X(i, j−1)−X(i, j+1).

The number of pixels under threshold counting circuit 906 is realization of, for example, the following algorithm by hardware or software. The high-pass filter output value is Y(i, j).

(1) i=1, j=1, K=0, T=threshold
(2) When Y(i, j)<T, K is incremented by 1.
(3) When i<m, i is incremented by 1 and the step returns to (2). When i=m, it is prescribed that i=1 and the step proceeds to (4).
(4) When j<n, j is incremented by 1 and the step returns to (2). When j=n, the algorithm is terminated. The value K at this time is the desired number of pixels under the threshold value.

The maximum–minimum difference calculating circuit 907 is realization of, for example, the following algorithm by hardware or software.

(1) i=1, j=1, MIN=a sufficiently large value, MAX=0
(2) When X(i, j)<MIN, MIN=X(i, j). When X(i, j)>MIN, MAX=X(i, j).
(3) When i<m, i is incremented by 1 and the step returns to (2). When i=m, it is prescribed that i=1 and the step proceeds to (4).
(4) When j<n, j is incremented by 1 and the step returns to (2). When j=n, the step proceeds to (5).
(5) The maximum–minimum difference=MAX−MIN is obtained and the algorithm is terminated.

Other than those described above, distribution or sum of squares of a part of the DCT coefficients can be calculated as the first physical quantity.

The distribution is then given by $$distribution = \left[\sum_{j=1}^{m}\sum_{i=1}^{n}\{X(i, j) - average\}^2\right] / (m \times n)$$

The sum of squares of a part of the DCT coefficients is given by the following expression. The DCT coefficient is D(u, v) and the input image block is X(i, j) where 0≦u≦7, 0≦v≦7, 0≦i≦7 and 0≦j≦7. The sum of squares is calculated only for a combination of u and v that were selected in advance.

$$D(u, v) = \frac{c(u)c(v)}{4}\sum_{j=0}^{7}\sum_{i=0}^{7}(X(i, j) - 128)\cos\frac{(2m+1)u\pi}{16}\cos\frac{(2n+1)v\pi}{16}$$

provided that $$c(u), c(v) = \frac{1}{\sqrt{2}}, \ (u, v = 0) \ \text{or} \ c(u), c(v) = 1 \ (u, v \neq 0)$$

(u, v=0) or c(u), c(v)=1 (u, v≠0)

$$\text{sum of squares of a part of } DCT \text{ coefficients} = \sum_{selected(u,v)}\{D(u, v) - average\}^2$$

However, the first physical quantity is not limited to the above examples. Any quantity may be the first physical quantity as long as it can be calculated from pixel values in a digitized image area.

Figure 3:
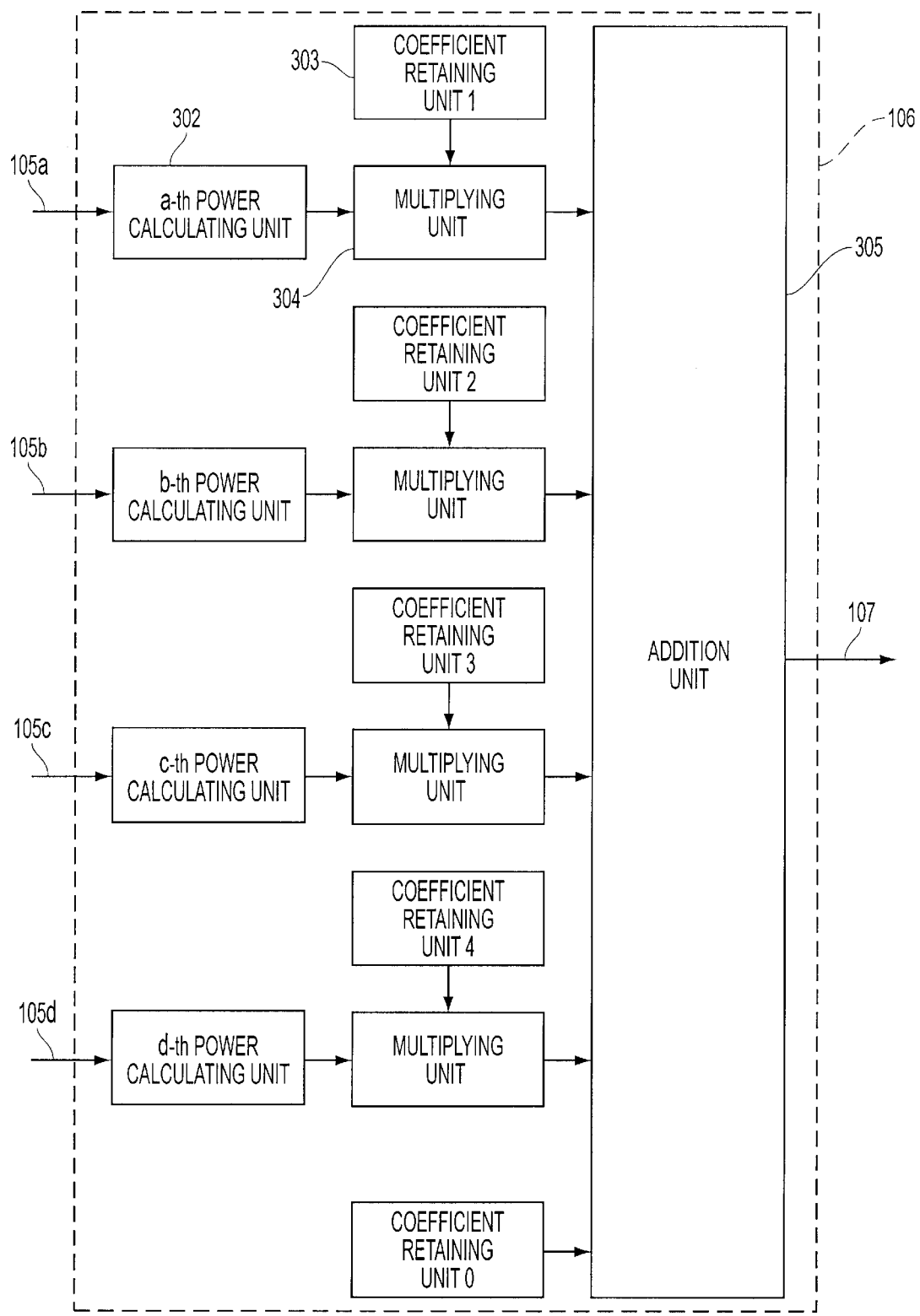
FIG. 3 is an exemplary block diagram showing a configuration of an image quality determining factor calculating unit.

As shown in FIG. 3, in the image quality determining factor calculating unit 106, each of the physical quantities 105a–105d is raised to the power n in the n-th power calculating unit 302. The n-th power calculation can be performed by, for example, using a lookup table that stores results of the n-th power calculation in advance. In the multiplying unit 304, each of the physical quantities raised to the n-th power is multiplied by the coefficient stored in the coefficient retaining unit 303. The results are added together in the addition unit 305. Thus, an image quality determining factor 107 is obtained. Suppose that each of the physical quantities are referred to as A, B, C and D, each of the coefficients are referred to as p, q, r and s, and a fixed coefficient retained by the coefficient retaining unit 0 is referred to as t. The image quality determining factor is obtained as follows:

image quality determining factor=$pA^a+qB^b+rC^c+sD^d+t$.

Figure 4A:
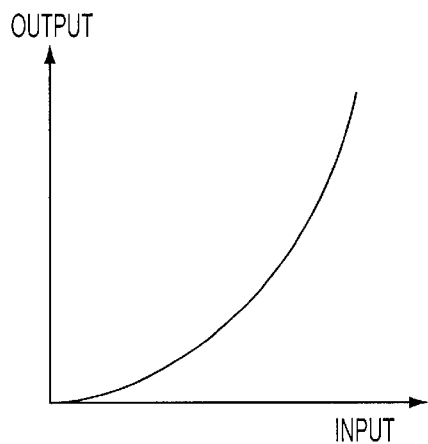
FIGS. 4(a)–4(c) illustrate a physical quantity transform unit of the first embodiment.
Figure 4B:
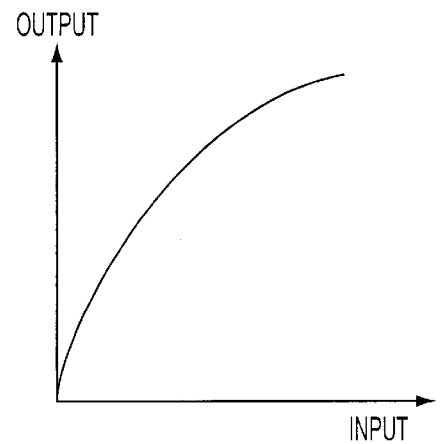
Figure 4C:
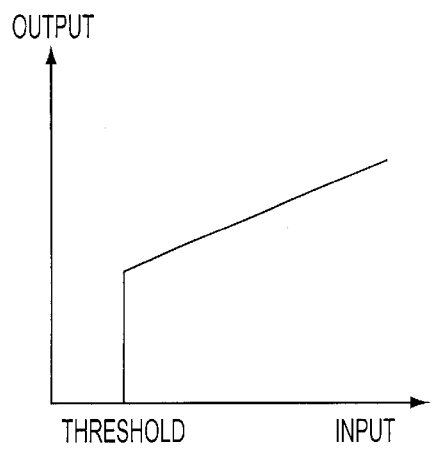

The n-th power calculation unit 302 realizes a linear or nonlinear function. In this case, the transformation function is realized by execution of the n-th power calculation. Then characteristics shown in FIG. 4(a) or 4(b) are available. Other functions can also be used. For example, as shown in FIG. 4(c), a function that results in 0 unless the input exceeds the threshold value and shows linear characteristics when the input exceeds the threshold value is acceptable.

The above parameters p, q, r, s, a, b, c and d are obtained as follows. Here, the image quality determining factor is defined as a frequency bandwidth of an image.

(1) Prepare N images.
(2) Generate an image with a limited frequency bandwidth by using a low-pass filter. M images with the limited frequency bandwidth are generated by M low-pass filters for each of the N images.
(3) Conduct a subjective evaluation for each of the images with the limited frequency bandwidth to examine whether difference between the original image and the image with the limited frequency bandwidth is recognized.
(4) Obtain the frequency bandwidth that affects the image quality for each of N images from the result of the subjective evaluation. The obtained frequency bandwidth is referred to as the image quality determining factor (second physical quantity) for each of the images.
(5) Optimize the parameters p, q, r, s, a, b, c and d according to the following procedure to predict the image quality determining factor from the first physical quantities.

1) Change a, b, c and d to any of 0.5, 1.0 and 2.0 (there are $3^4$ possibilities of combinations).
2) Obtain p, q, r and s for each case by a multiple regression analysis.
3) Select a parameter that makes correlation between the image quality determining factor obtained by the subjective evaluation and that predicted by using the parameters p, q, r, s, a, b, c and d highest.

The number of gray scale steps of an image can also be the image quality determining factor.

Figure 5:
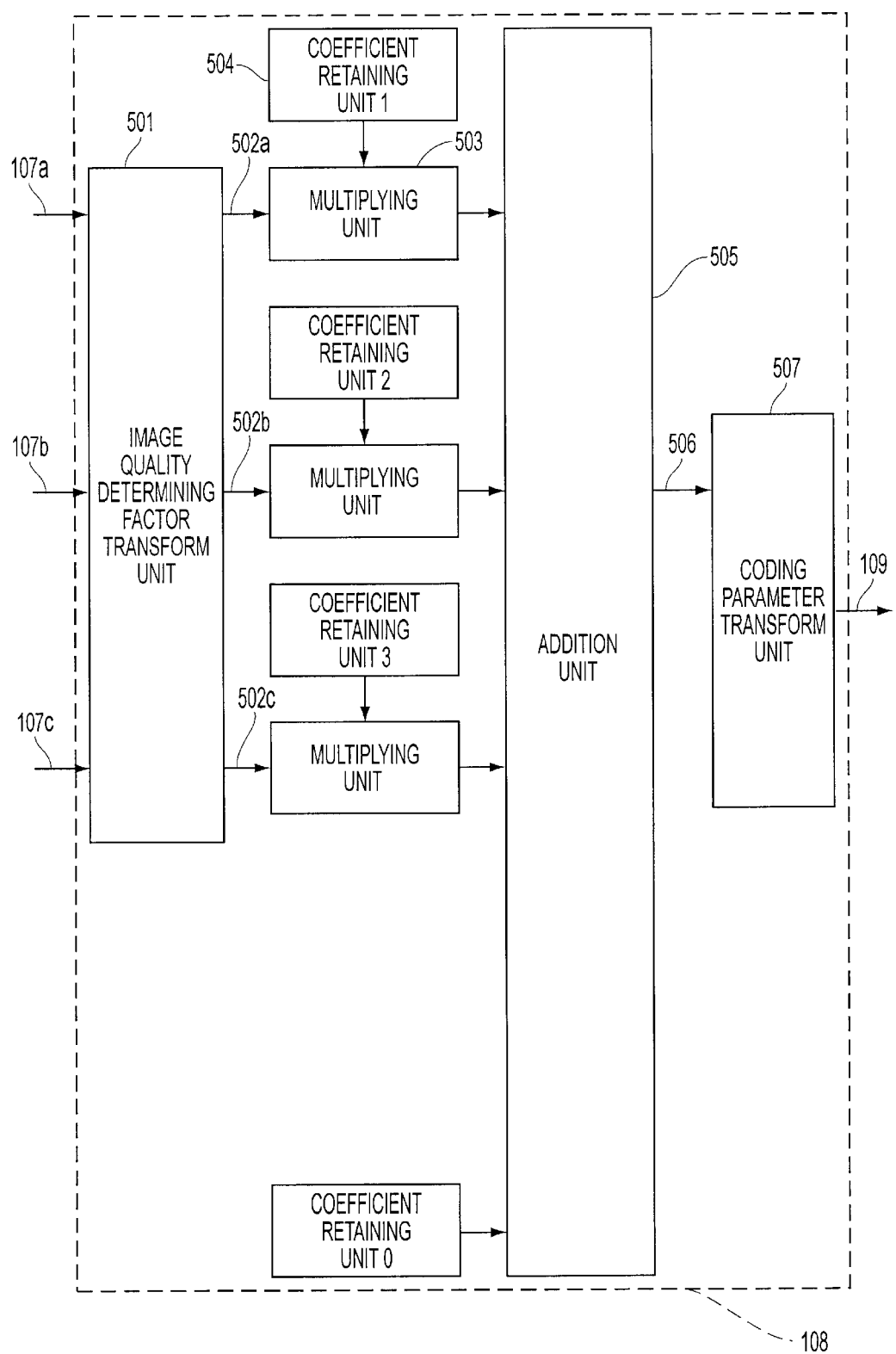
FIG. 5 is an exemplary block diagram showing a configuration of a coding parameter calculating unit of the first embodiment.

The coding parameter calculating unit 108 is described by reference to FIG. 5. Suppose that there are three image quality determining factors 107a, 107b and 107c. The image quality determining factor transform unit 501 executes a nonlinear transform on each of the image quality determining factors. In the multiplying unit 503, each of the transformed image quality determining factors is multiplied by the coefficient stored in the coefficient retaining unit 504.

The results are added together to obtain a provisional coding parameter 506. The transformed image quality determining factors are referred to as A, B and C, the coefficients are referred to as p, q and r, and the fixed coefficient retained by the coefficient retaining unit 0 is referred to as s. Then the calculation of the provisional coding parameter is given as follows:

a provisional coding parameter=$pA+qB+rC+s$.

The provisional coding parameter is transformed in the coding parameter transform unit 507 and a coding parameter 109 is output.

The coding parameter transform unit 507 finely adjusts the provisional coding parameter to match with the actually measured coding parameter using a lookup table. For example, the coding parameter transform unit 507 transforms the characteristics such as LUT1 or LUT2 shown in FIG. 7.

Figure 7:
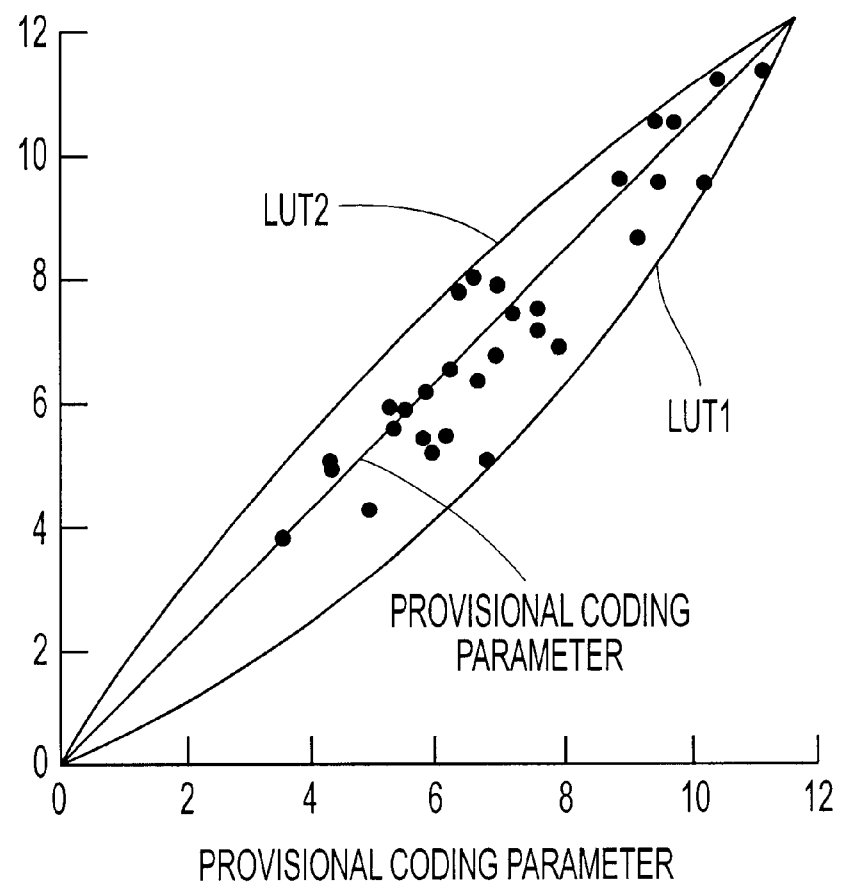
FIG. 7 illustrates a coding parameter transform unit of the first embodiment.

As shown in FIG. 7, the coding parameter actually measured by the subjective evaluation is distributed with some distance from the provisional coding parameter. In FIG. 7, the coding parameter of a smaller value indicates better image quality.

When the provisional coding parameter is used, the block noise occurs in an image below the line indicating the provisional coding parameter in FIG. 7. To avoid this problem, the transform of the predicted coding parameter such as LUT1 in FIG. 7 can be performed. The transform is implemented by a lookup table.

In an image above the line indicating the provisional coding parameter, the coding rate is lowered. To maintain the coding rate, the transform of the predicted coding parameter such as indicated by LUT2 is performed though the image quality is somewhat deteriorated.

It is possible to prepare plural lookup tables and switch them from one to another to control the image quality.

It is also possible to use the output value of the addition unit 505 as the objective coding parameter without utilizing the coding parameter transform unit 507.

In the image quality determining factor transform unit 501, when one of the image quality determining factor is smaller than others, it is excluded from the calculation of the coding parameter. That is, the image quality determining factor is regarded as zero because it affects little to the image quality.

When there are two physical quantities, namely, two image quality determining factors, suppose that they are referred to as A and B, respectively (each of A and B is plus or zero) and there are predetermined thresholds P and Q.

Then the following process is performed:

when A−B>threshold P, B=0; and when B−A>threshold Q, A=0.

When there are three physical quantities, namely, three image quality determining factors, suppose that they are referred to as A, B and C, respectively (each of A, B and C is plus or zero).

Then the following process is performed:

when A−B>threshold AB, B=0;

when B−A>threshold BA, A=0;

when A−C>threshold AC, C=0;

when C−A>threshold CA, A=0;

when C−B>threshold CB, B=0; and when B−C>threshold BC, C=0.

In the case of four or more image quality determining factors, the similar process is performed.

In general, if it is supposed that i-th image quality determining factor is referred to as A(i), transformation is performed as follows:

when $A(n)-A(i)>$ threshold ni, $A(i)=0 (n \neq )$.

The image quality determining factor transform unit 501 can be configured so that, if one of the image quality determining factors is smaller than others, the value of the image quality determining factor is reduced because it has little affection to the image quality, instead of being regarded as zero as in the former example.

In this method, a coefficient β is required. If there are two second physical quantities, namely, two image quality determining factors and they are referred to as A and B (each of A and B is plus or zero) and there are predetermined thresholds P and Q, the following process is performed:

when A−B>threshold P, B=B−β×{(A−B)−threshold P}; and when B−A>threshold Q, A=A−β×{(B−A)−threshold Q}.

Further the following process is performed:

when B<0, B=0; and when A<0, A=0.

In the case where there are three second physical quantities, namely, three image quality determining factors and they are referred to as A, B and C, respectively (each of A, B and C is plus or zero), the following process is performed:

SA=MAX{(B−A)−threshold BA, (C−A)−threshold CA} when SA>0, A=A−β×SA;

SB=MAX{(A−B)−threshold AB, (C−B)−threshold CB} when SB>0, B=B−β×SB; and

SC=MAX{(A−C)−threshold AC, (B−C)−threshold BC} when SC>0, C=C−β×SC.

Further, the following process is performed:

when A<0, A=0;

when B<0, B=0; and when C<0, C=0, wherein MAX(X1, X2, X3, . . . ) is a function that outputs a maximum value of X1, X2, X3, . . . .

In the case where there are four or more image quality determining factors, the similar method is applied. Suppose that i-th image quality determining factor is referred to as A(i) and a threshold used for comparing A(i) with A(j) is set and referred to as threshold ji. When n≠i, Si is defined as the maximum value of {(A(n)−A(i))−threshold ni}. The following process is then performed:

when Si>0, A(i)=A(i)−β×Si; and when A(i)<0, A(i)=0.

Figure 6:
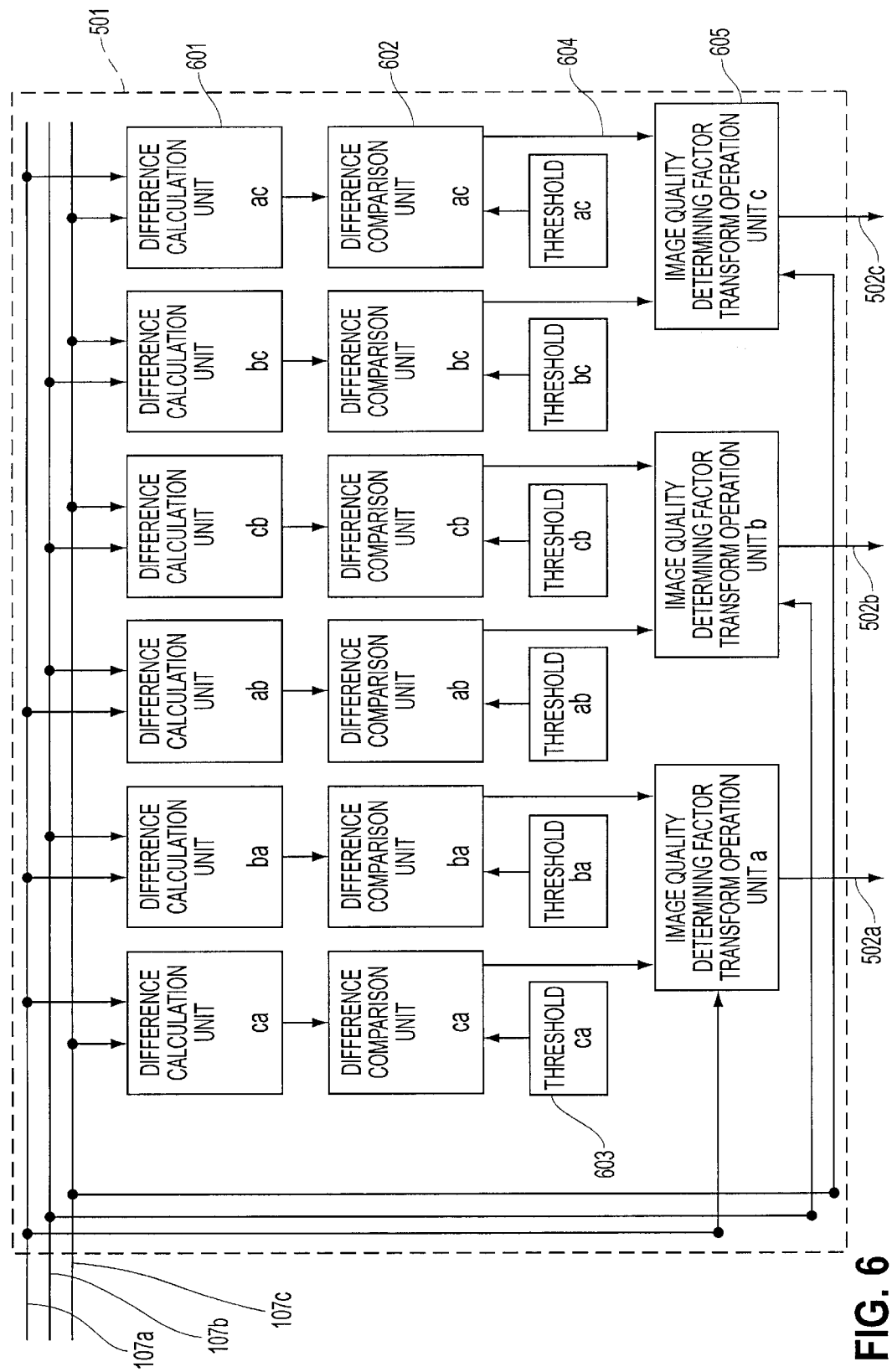
FIG. 6 is an exemplary block diagram showing a configuration of an image quality determining factor transform unit of the first embodiment.

An example of configuration of the image quality determining factor transform unit 501 in the case of three image quality determining factors is described by reference to FIG. 6.

A difference calculation unit 601 selects two of the input image quality determining factors and calculates a difference between the selected two image quality determining factors. A difference comparison unit 602 compares the difference with a threshold retained in the threshold retaining unit 603 and outputs an image quality determining factor transformation flag 604 that indicates whether the difference is larger or smaller than the threshold. The image quality determining factor transformation flag is set to ON state when the difference is larger than the threshold and set to OFF state when the difference is smaller than the threshold. When the image quality determining factor transformation flag 604 is in the ON state, the image quality determining factor transform operation unit 605 outputs zero as the transformed image quality determining factor. When the image quality determining factor transformation flag 604 is in the OFF state, the image quality determining factor transform operation unit 605 outputs the quantity of image quality determining factor 107 as the transformed image quality determining factor 502.

A result of prediction of the coding parameter according to the first embodiment is described as follows.

Coding is performed on plural images with different coding parameters. Each of the plural coded images is then decoded and the subjective evaluation is conducted thereon. According to the result of the evaluation, a coding parameter that provides desired image quality to each image can be obtained.

Figure 12:
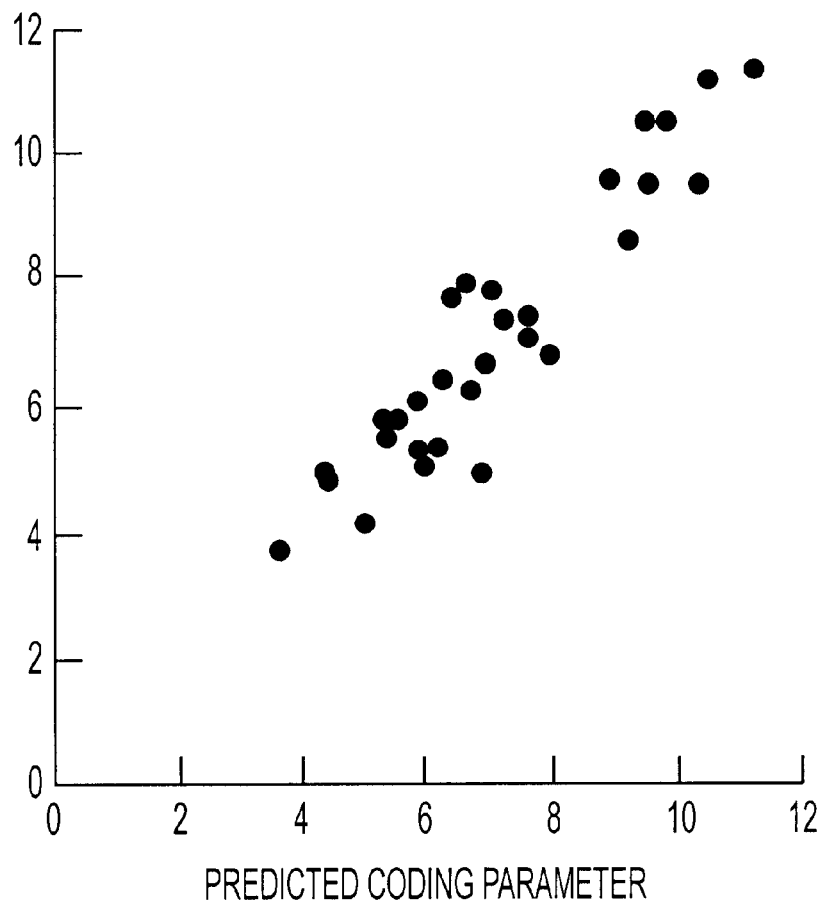
FIG. 12 illustrates a result of analysis of preciseness of prediction of coding parameters according to the present invention.
Figure 13A:
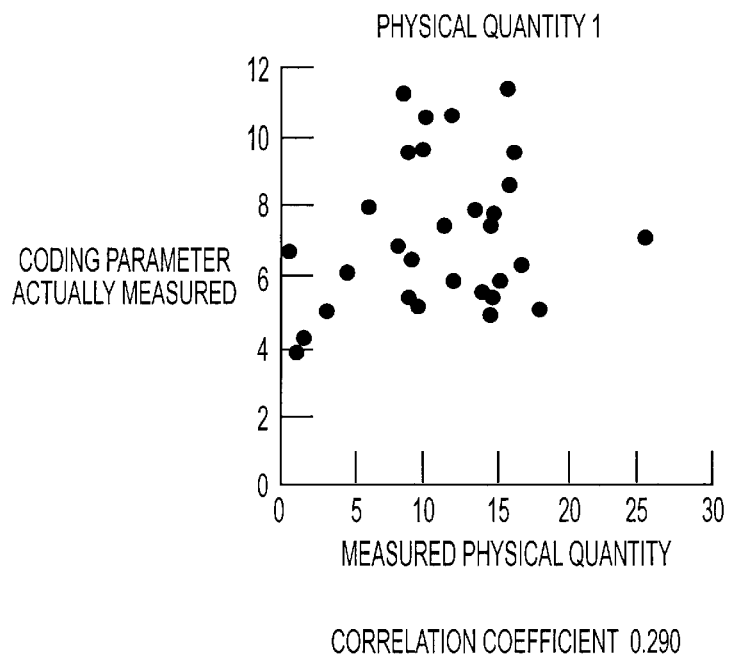
FIGS. 13(a)–13(e) illustrate a result of analysis of preciseness of prediction of coding parameters according to the conventional example.
Figure 13B:
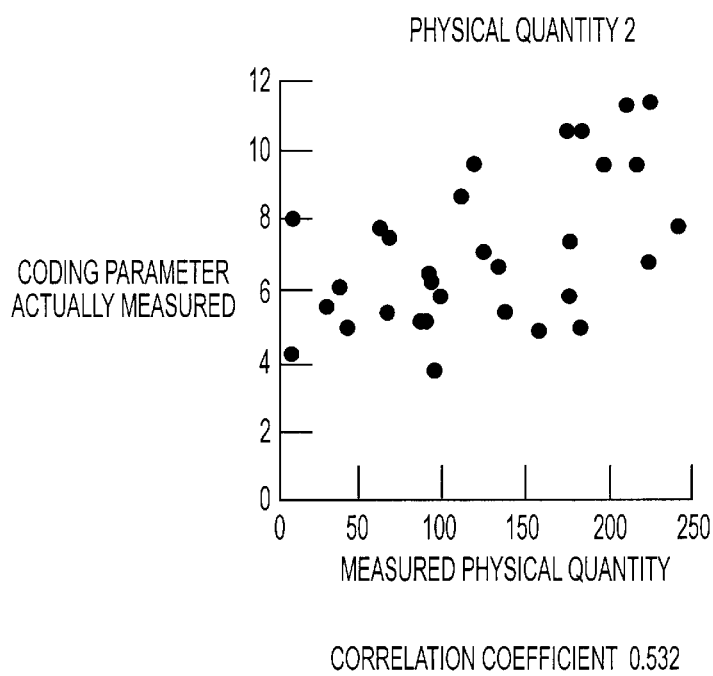
Figure 13C:
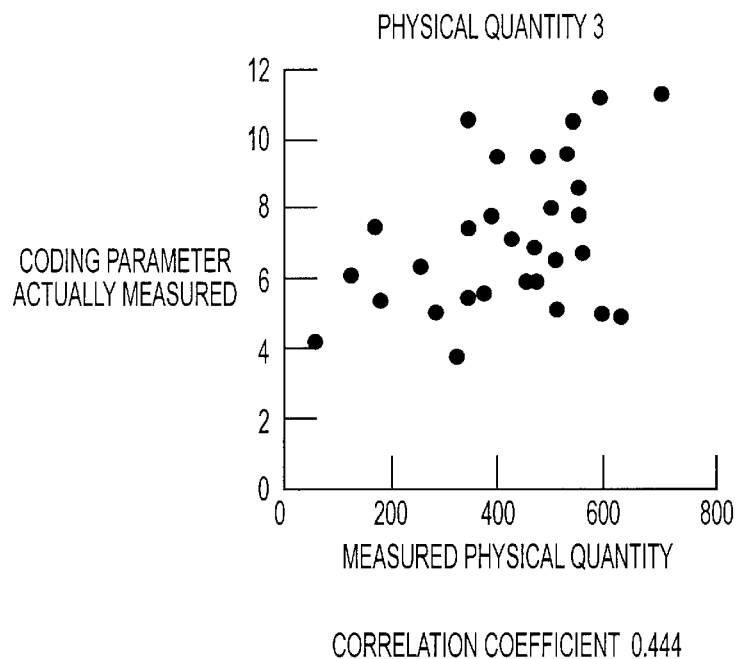
Figure 13D:
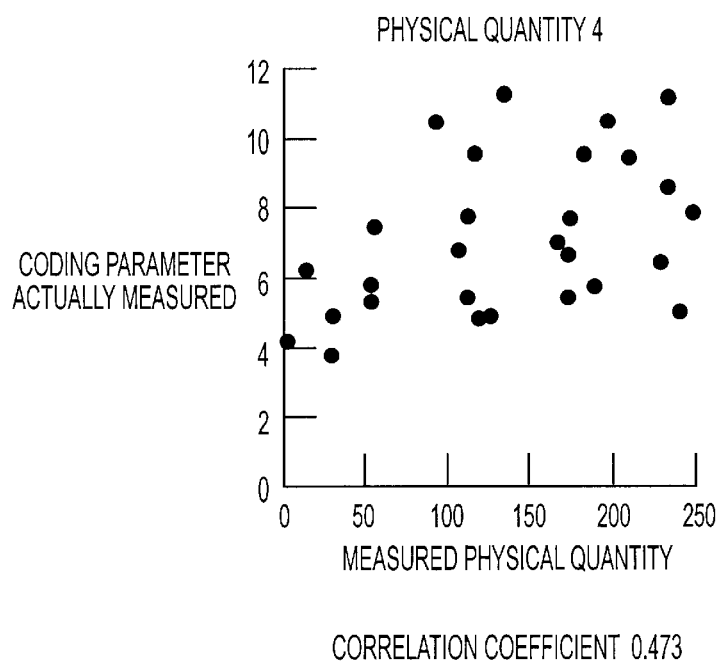
Figure 13E:
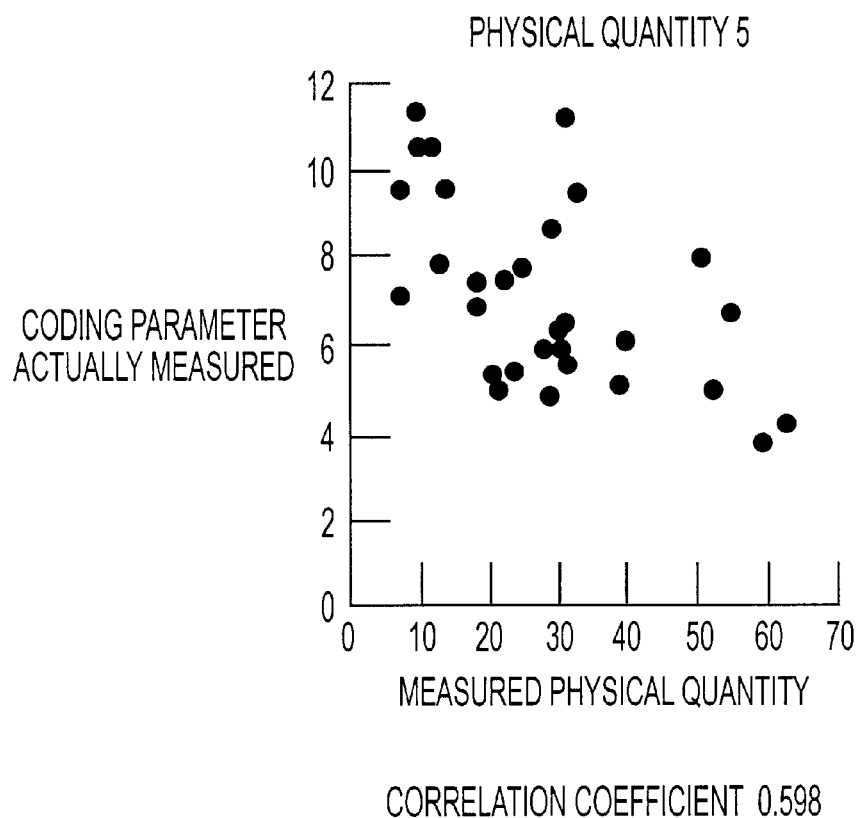
Figure 14:
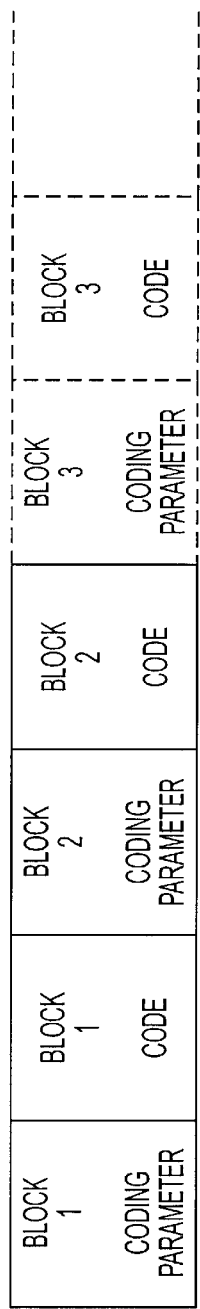
FIG. 14 illustrates a configuration of code.
Figure 15:
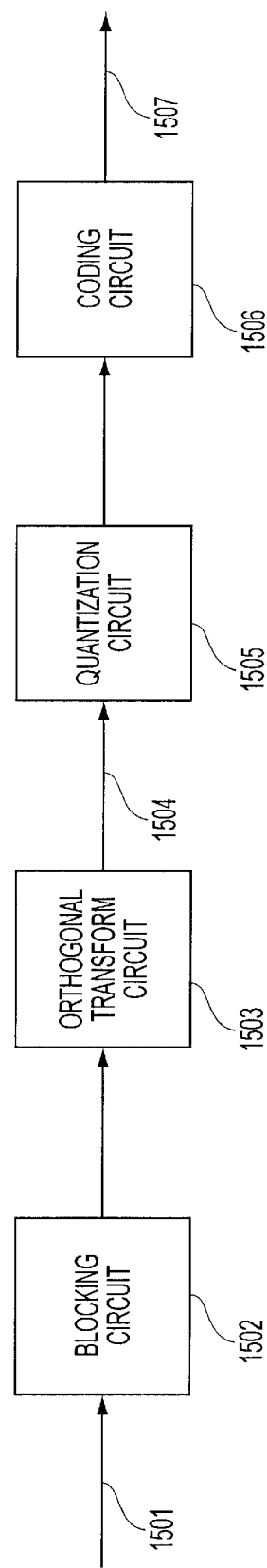
FIG. 15 is a block diagram showing an example of a configuration of the DCT coding method.
Figure 16:
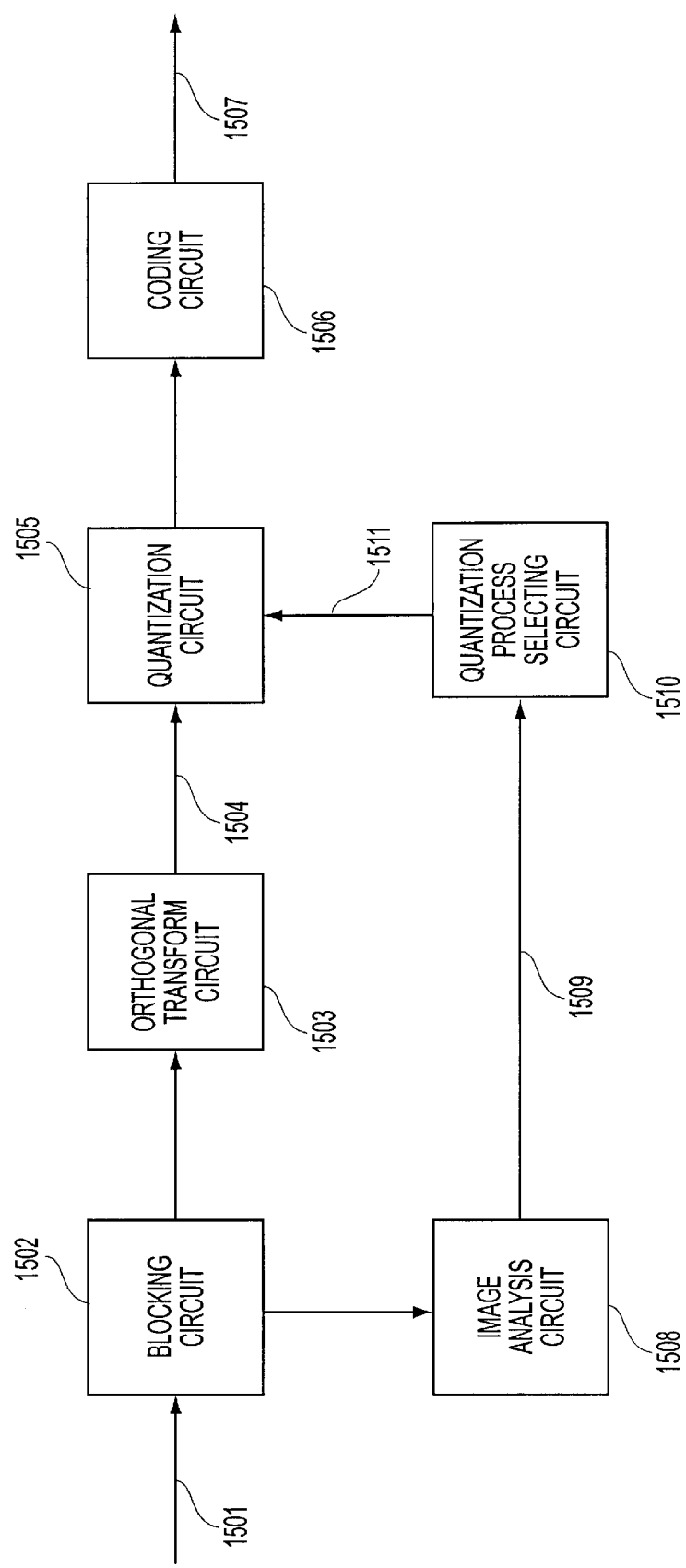
FIG. 16 is a block diagram showing an example of a configuration of a conventional method.
Figure 19:
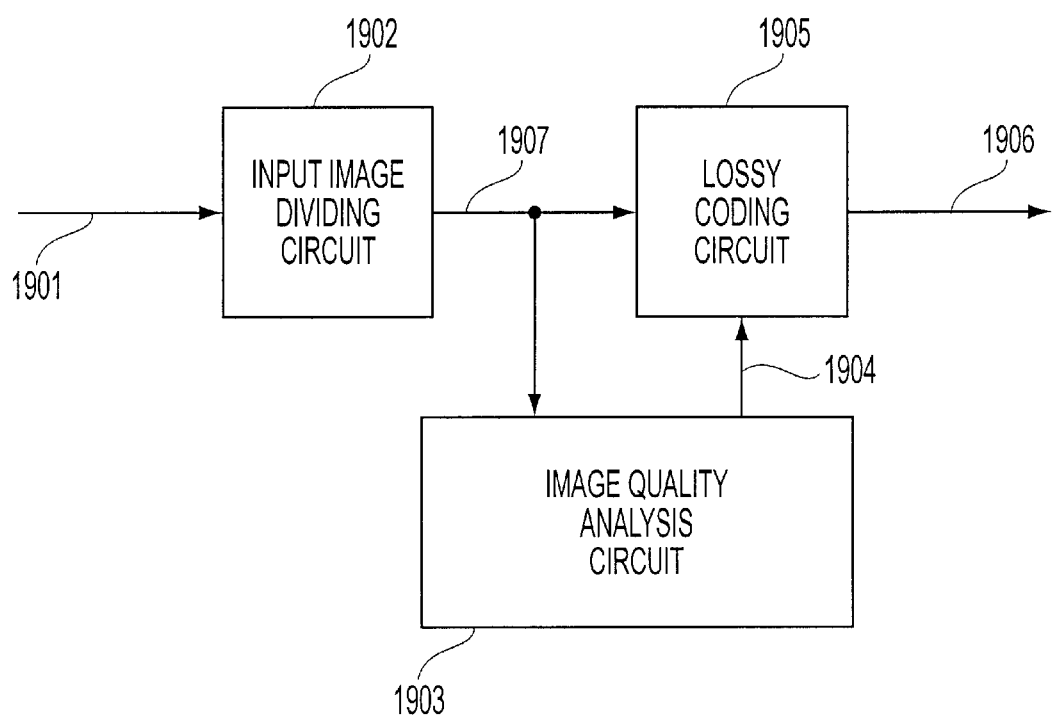
FIG. 19 is a block diagram showing an example of a system where the present invention is applied.

FIG. 12 shows a mapping of the results of the prediction of the coding parameter according to the first embodiment and the coding parameter actually measured by the subjective evaluation. The correlation between the predicted coding parameter and the actually measured coding parameter is 0.937. A favorable prediction is possible.

The first reason why the favorable prediction is available is an improvement of preciseness achieved by optimizing various parameters in the image quality determining factor calculating unit or coding parameter calculating unit, such as the threshold in the physical quantity calculating unit 104, value of n in the n-th power calculating unit 302, coefficients in the coefficient retaining units 303 or 504, and so forth. The second reason is that the image quality determining factor having little affection to the image quality is degraded. That is, a visual masking effect is adopted in the prediction.

The result of prediction according to the conventional method is as follows.

In the conventional method, the prediction is performed based on only one physical quantity. Each of FIGS. 13(*a*)–13(*e*) shows correlation when each of five physical quantities in the first embodiment, namely, the average (physical quantity 1), the average crossing number (physical quantity 2), the maximum–minimum difference (physical quantity 3), the maximum high-pass pixel value (physical quantity 4) and the number of pixels under threshold (physical quantity 5) is measured. It is found from the figures that the correlation based on a single physical quantity is low, and therefore the favorable prediction is unavailable.

Second Embodiment

In the second embodiment, the image quality determining factor is calculated based on the physical quantities calculated in plural image areas.

As shown in FIG. 2, the image area to be analyzed is extracted so that it is larger than the block to be coded. This is because a stable analysis result is expected when the analysis is conducted on a large image area.

However, the load of analysis is increased because the areas to be analyzed overlap with each other. The second embodiment is described by reference to FIGS. 8 and 9, which is a device and method for conducting analysis in a large image area without increasing the load of analysis.

Figure 8:
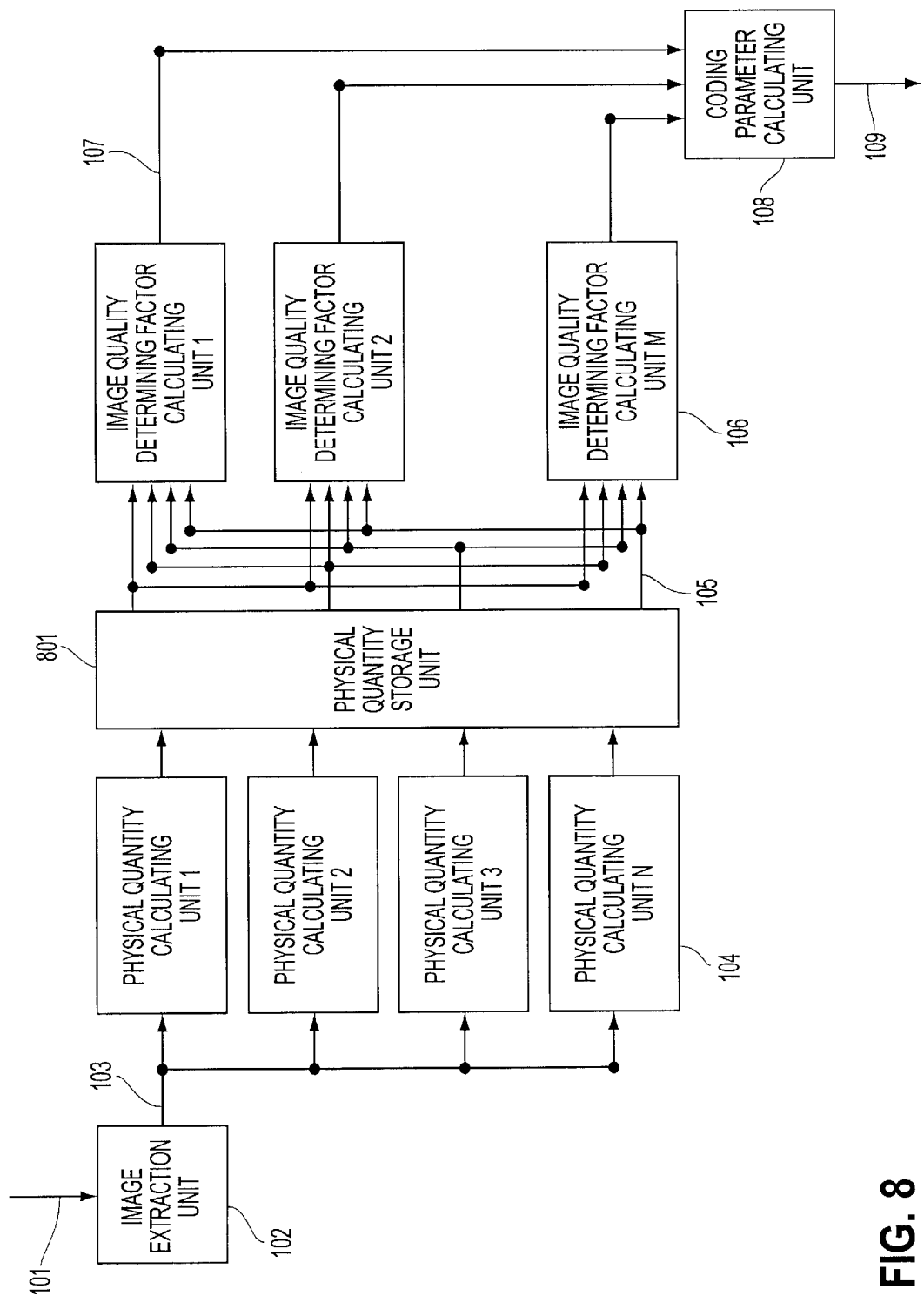
FIG. 8 is an exemplary block diagram showing an overall configuration of a second embodiment of the present invention.

In FIG. 8, a physical quantity calculated by the physical quantity calculating unit 104 is temporarily input to a physical quantity storage unit 801. The image quality determining factor calculating unit 106 extracts the same kind of plural physical quantities of plural image portions in an image area from the physical quantity storage unit 801 and calculates the image quality determining factor. For calculation of the image quality determining factor, an average of the physical quantities of the plural image areas or maximum or minimum value of the physical quantities of the plural image portions is defined as the physical quantity of the image portion to be coded.

Figure 9:
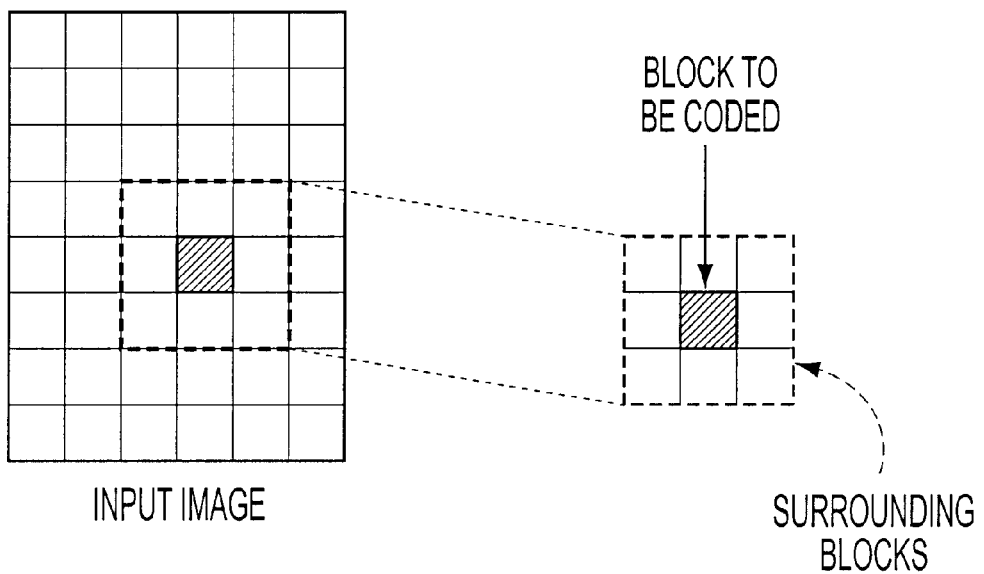
FIG. 9 illustrates an image quality determining factor calculating unit of the second embodiment.

FIG. 9 shows the plural image portions. In the figure, the shaded block is the block to be coded. The physical quantities of the blocks surrounding the shaded block are also used for the analysis of the shaded block. In the example of FIG. 9, an average, a maximum value or minimum value of the physical quantities of the 9 (=3×3) blocks is regarded as the physical quantity of the shaded block.

Third Embodiment

In the first embodiment, the coding parameter calculating unit calculates the coding parameter by linear combination of transformed image quality determining factors. In the third embodiment, a coding parameter is calculated for each image quality determining factor and one of the parameters that provides the best image quality is selected.

Figure 11:
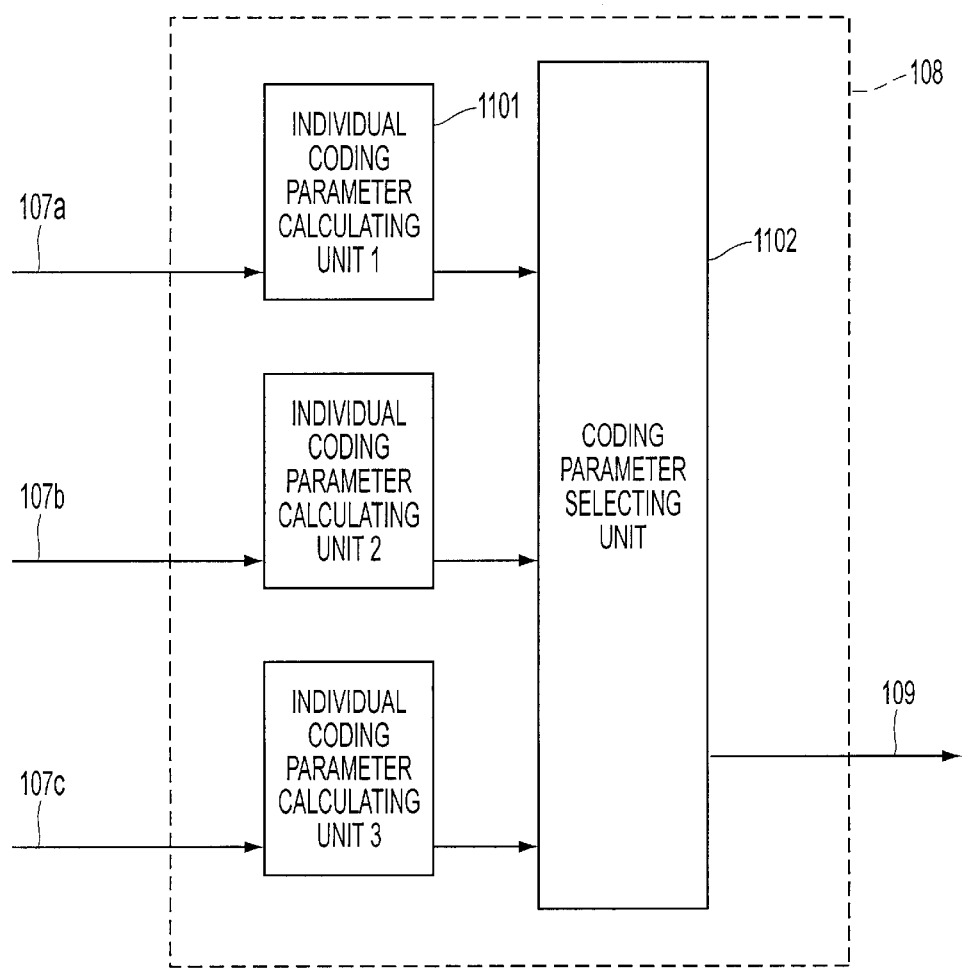
FIG. 11 is an exemplary block diagram showing an example of another configuration of the coding parameter calculating unit.

The coding parameter calculating unit of the third embodiment is described by reference to FIG. 11. An individual coding parameter calculating unit 1101 calculates a coding parameter using a lookup table predetermined based on each image quality determining factor, or the like. A coding parameter selecting unit 1102 selects and outputs one of the individual coding parameters calculated from the plural image quality determining factors, respectively, which provides the best image quality. For example, in the case where the scaling factor in JPEG-DCT method is adopted as the individual coding parameter, the minimum scaling factor is selected as the objective coding parameter.

What is claimed is:

1. An image analysis device for obtaining a coding parameter for each image portion to be coded in an input image for coding thereof, comprising:

an image extraction unit that extracts an image area including an image portion to be coded from the input image;

at least one first physical quantity calculating unit that calculates a first physical quantity indicating a characteristic of the image area extracted by the image extraction unit;

a plurality of second physical quantity calculating units each of which calculates a second physical quantity of the image area based on at least one first physical quantity calculated by at least one first physical quantity calculating unit, respectively; and a coding parameter calculating unit that calculates a coding parameter for the image portion to be coded based on the plurality of second physical quantities.

2. The image analysis device as set forth in claim 1, further comprising:

a first storage unit that stores a plurality of first physical quantities indicating characteristics of a plurality of image portions including the image portion to be coded in the extracted image area, wherein the first physical quantity of the image area including the image portion to be coded is calculated based on the plurality of first physical quantities stored in the first storage unit.

3. The image analysis device as set forth in claim 1, wherein the second physical quantity calculating unit comprises:

at least one first physical quantity transform unit that transforms a value of the first physical quantity by using a parameter;

a first physical quantity addition unit; and a coefficient retaining unit that retains a coefficient obtained by adding one to the number of the first physical quantities, and wherein the second physical quantity calculating unit obtains the second physical quantity by transforming each of at least one first physical quantity, multiplying each of them by the coefficient and adding results together.

4. The image analysis device as set forth in claim 3, wherein the first physical quantity transform unit calculates n-th power of the first physical quantity.

5. The image analysis device as set forth in claim 1, wherein the coding parameter calculating unit comprises:
   a second physical quantity transform unit;
   a second physical quantity addition unit; and
   a coefficient retaining unit that retains a coefficient obtained by adding one to the number of second physical quantities, and wherein the coding parameter is obtained by transforming each of the plurality of second physical quantities by using a function, multiplying each of them by the coefficient and adding results together.

6. The image analysis device as set forth in claim 5, wherein the function is a linear function.

7. The image analysis device as set forth in claim 5, wherein the function is a nonlinear function.

8. The image analysis device as set forth in claim 1, wherein the coding parameter calculating unit comprises:
   a second physical quantity transform unit;
   a second physical quantity addition unit;
   a coefficient retaining unit that retains a coefficient obtained by adding one to the number of the second physical quantities; and
   a coding parameter transform unit, and wherein the coding parameter calculating unit obtains an objective coding parameter by transforming each of the plurality of second physical quantities by a function, multiplying each of them by the coefficient, adding results together to generate a provisional coding parameter and transforming the provisional coding parameter by the coding parameter transform unit.

9. The image analysis device as set forth in claim 8, wherein the function is a linear function.

10. The image analysis device as set forth in claim 8, wherein the function is a nonlinear function.

11. The image analysis device as set forth in claim 8, wherein the coding parameter transform unit comprises:
    a plurality of lookup tables, and wherein the coding parameter transform unit selects one of the plurality of lookup tables in accordance with a required image quality and calculates the objective coding parameter from the provisional coding parameter by using the lookup table.

12. The image analysis device as set forth in claim 5, wherein the coding parameter calculating unit comprises:
    a threshold retaining unit that retains a threshold;
    a second physical quantity comparing unit that calculates a difference between an absolute value of a predetermined second physical quantity and an absolute value of another second physical quantity; and
    a second physical quantity reducing unit that reduces the a value of the predetermined second physical quantity to zero when the difference is not less than the threshold.

13. The image analysis device as set forth in claim 8, wherein the coding parameter calculating unit comprises:
    a threshold retaining unit that retains a threshold;
    a second physical quantity comparing unit that calculates a difference between an absolute value of a predetermined second physical quantity and an absolute value of another second physical quantity; and
    a second physical quantity reducing unit that reduces the a value of the predetermined second physical quantity to zero when the difference is not less than the threshold.

14. The image analysis device as set forth in claim 12, wherein the second physical quantity reducing unit reduces the value of the predetermined second physical quantity in proportion to the difference when the difference is not less than the threshold.

15. The image analysis device as set forth in claim 13, wherein the second physical quantity reducing unit reduces the value of the predetermined second physical quantity in proportion to the difference when the difference is not less than the threshold.

16. The image analysis device as set forth in claim 1, wherein one of at least one first physical quantity is an average of pixel values in the image area.

17. The image analysis device as set forth in claim 1, wherein one of at least one first physical quantity is a distribution of pixel values in the image area.

18. The image analysis device as set forth in claim 1, wherein one of the first physical quantity calculating units comprises:
    an average calculating unit that calculates an average of pixel values in the image area;
    a pixel image extraction unit that extracts pixel values in the image area in order of raster scanning;
    a pixel value comparing unit that compares the average and each of the pixel values;
    a comparison result retaining unit that retains a result of the comparison performed by the pixel value comparing unit; and
    an average crossing number retaining unit that retains an average crossing number, and wherein the average crossing number is calculated by incrementing a previous average crossing number retained by the average crossing number retaining unit by one when the result of the comparison differs from the result of comparison previously performed retained by the comparison result retaining unit.

19. The image analysis device as set forth in claim 1, wherein one of at least one first physical quantity calculating unit comprises:
    a high-pass filter, and wherein the first physical quantity calculating unit outputs a maximum value of outputs from the high-pass filter as the first physical quantity.

20. The image analysis device as set forth in claim 19, wherein the first quantity calculating unit outputs the number of pixels whose high-pass filtering output value is smaller than a predetermined threshold as the first physical quantity.

21. The image analysis device as set forth in claim 1, wherein one of at least one first physical quantity calculating unit comprises:
    a maximum–minimum difference calculating unit that obtains a maximum pixel value and a minimum pixel value in the image area and a difference between them, and wherein the first physical quantity calculating unit outputs the difference as the first physical quantity.

22. The image analysis device as set forth in claim 1, wherein one of at least one first physical quantity calculating unit outputs a sum of squares of part of DCT coefficients as the first physical quantity.

23. The image analysis device as set forth in claim 1, wherein the coding parameter calculating unit comprises:

a plurality of individual coding parameter calculating units each of which transforms each of the plurality of second physical quantities into an individual coding parameter; and a coding parameter selecting unit that selects a coding parameter that provides the best image quality from among the individual coding parameters transformed by the plurality of individual coding parameter calculating units.

24. An image analysis method for obtaining a coding parameter for each image portion to be coded in an input image for coding thereof, comprising the steps of:

extracting an image area which includes an image portion to be coded from the input image;

calculating at least one first physical quantity indicating a characteristic of the extracted image area;

calculating a plurality of second physical quantities based on at least one first physical quantity; and obtaining a coding parameter for the image portion to be coded based on the plurality of second physical quantities.

* * * * *